UNITED STATES PATENT OFFICE.

WILLIAM EDWARD HARRIS, OF NEW YORK, N. Y.

MANUFACTURING WHITE LEAD.

SPECIFICATION forming part of Letters Patent No. 352,316, dated November 9, 1886.

Application filed January 5, 1886. Serial No. 187,695. (No specimens.)

*To all whom it may concern:*

Be it known that I, WILLIAM EDWARD HARRIS, a citizen of the United States, residing at New York, in the county of New York and State of New York, have invented a new and useful Improvement in the Manufacture of Carbonate of Lead, of which the following is a specification.

The object of this invention is to simplify and cheapen the manufacture of carbonate of lead.

In carrying my invention into practical use about six hundred pounds of carbonate of soda and two thousand pounds of sublimed lead are well mixed in a tank with about two thousand pounds of water for about five hours. The mixture is then allowed to settle for about three hours, and the liquid above the lead is then drawn off. The lead is then washed with about two thousand pounds of water for about half an hour, during which time it is kept well stirred, and is then allowed to settle for about two hours. The liquid above the lead is then drawn off, and the lead is taken out and put into an evaporating-furnace, and when dried and taken out it will be found to be carbonate of lead, ready to be used for paint.

The liquid drawn off from the baths may be utilized for the manufacture of carbonate of lead by evaporating it, melting the residue in a crucible for about two hours, then mixing it with water and sublimed lead, and treating it in the same manner as hereinbefore described, bicarbonate of soda being added to keep up the supply of soda.

The sublimed lead is obtained by smelting sulphur-bearing lead ores, or metallic lead melted in contact with sulphur-bearing coal or ores of any kind, and condensing the fumes. The residue will be a white powder in a very finely divided condition composed of sulphite and sulphate of lead, and known and sold in the market under the commercial name of "sublimed lead."

In making the carbonate of lead from sublimed lead the reactions are as follows: The carbonate of soda, when mixed with the sublimed lead and water, changes from a carbonate to a sulphite and sulphate, and the sublimed lead, which is a sulphite and a sulphate, changes to a carbonate. The carbonate of lead thus formed, when washed to take out the sulphate of soda and dried, is ready to be made into a paint.

Having thus described my invention, what I claim as new, and desire to secure by Letters Patent, is—

In the manufacture of carbonate of lead, the combination of sulphite and sulphate of lead and carbonate of soda, made substantially as herein described.

WILLIAM EDWARD HARRIS.

Witnesses:
JAMES T. GRAHAM,
C. SEDGWICK.